US012750591B2

(12) United States Patent
Yoshida

(10) Patent No.: US 12,750,591 B2
(45) Date of Patent: Sep. 29, 2026

(54) IMAGE PICKUP APPARATUS CAPABLE OF SUPPRESSING OCCURRENCE OF EXPOSURE DEVIATION WITHIN IMAGE WHILE SPEEDING UP STROBE SYNCHRONIZATION MAXIMUM SHUTTER SPEED, CONTROL METHOD FOR IMAGE PICKUP APPARATUS, AND STORAGE MEDIUM

(71) Applicant: CANON KABUSHIKI KAISHA, Tokyo (JP)

(72) Inventor: Nobukazu Yoshida, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 28 days.

(21) Appl. No.: 19/080,110

(22) Filed: Mar. 14, 2025

(65) Prior Publication Data

US 2025/0317655 A1 Oct. 9, 2025

(30) Foreign Application Priority Data

Apr. 8, 2024 (JP) ................................ 2024-062067

(51) Int. Cl.

| | |
|---|---|
| ***H04N 23/72*** | (2023.01) |
| ***G03B 7/00*** | (2021.01) |
| ***G03B 7/087*** | (2021.01) |
| ***G03B 9/06*** | (2021.01) |
| ***G03B 9/08*** | (2021.01) |
| ***G03B 9/10*** | (2021.01) |

(Continued)

(52) U.S. Cl.

CPC ........... *H04N 23/72* (2023.01); *H04N 23/667* (2023.01); *H04N 23/682* (2023.01); *H04N 23/70* (2023.01); *H04N 23/73* (2023.01); *H04N 23/74* (2023.01)

(58) Field of Classification Search

CPC .... H04N 23/667; H04N 23/682; H04N 23/70; H04N 23/72; H04N 23/73; H04N 23/74; H04N 25/232; H04N 21/4854; G03B 9/00; G03B 9/08; G03B 9/10; G03B 9/06; G03B 7/00; G03B 7/087

See application file for complete search history.

(56) References Cited

U.S. PATENT DOCUMENTS 5,940,640 A * 8/1999 Karasawa ................ G03B 9/62 396/301
6,122,451 A * 9/2000 Asahi ....................... G03B 7/00 396/212

(Continued)

FOREIGN PATENT DOCUMENTS

JP 2008060640 A 3/2008

*Primary Examiner* — Marly S Camargo
(74) *Attorney, Agent, or Firm* — Cowan, Liebowitz & Latman, P.C.

(57) ABSTRACT

An image pickup apparatus includes a strobe light emitting unit, a shutter configured to include a front curtain and a rear curtain that control exposure to an image pickup device, at least one processor, and a memory coupled to the processor storing instructions that, when executed by the processor, cause the processor to function as a setting unit that sets a light emission amount of the strobe light emitting unit. The setting unit sets, based on a traveling time of the front curtain, an upper limit value of the light emission amount when performing strobe synchronization photographing at a strobe synchronization maximum shutter speed.

14 Claims, 6 Drawing Sheets

(51) Int. Cl.

| | |
|---|---|
| ***H04N 23/667*** | (2023.01) |
| ***H04N 23/68*** | (2023.01) |
| ***H04N 23/70*** | (2023.01) |
| ***H04N 23/73*** | (2023.01) |
| ***H04N 23/74*** | (2023.01) |

(56) References Cited

U.S. PATENT DOCUMENTS

| | | | | |
|---|---|---|---|---|
| 6,776,540 | B2 * | 8/2004 | Toyoda | G03B 9/40 396/484 |
| 11,700,451 | B2 * | 7/2023 | Karibe | H04N 23/687 |
| 12,578,623 | B2 * | 3/2026 | Matsumoto | G03B 7/16 |
| 2011/0181754 | A1 * | 7/2011 | Iwasaki | H04N 23/73 348/230.1 |
| 2011/0293257 | A1 * | 12/2011 | Ariga | G03B 15/04 396/166 |
| 2026/0006307 | A1 * | 1/2026 | Takai | H04N 23/56 |

* cited by examiner

FIG. 5A

STROBE SYNCHRONIZATION MAXIMUM SHUTTER SPEED

| SHUTTER TYPE/STILL IMAGE CROP | FULL SIZE | APS-C | FULL SIZE | APS-C |
|---|---|---|---|---|
| ELECTRONIC SHUTTER | 1/400 | 1/500 | 1/320 | 1/400 |
| ELECTRONIC FRONT CURTAIN | 1/320 | 1/400 | 1/250 | 1/320 |
| MECHANICAL SHUTTER | 1/250 | 1/320 | 1/200 | 1/250 |
| | SPEEDUP : ON | | SPEEDUP : OFF | |

FIG. 5B

LIGHT EMISSION AMOUNT UPPER LIMIT VALUE

| SHUTTER TYPE/STILL IMAGE CROP | FULL SIZE | APS-C | FULL SIZE | APS-C |
|---|---|---|---|---|
| ELECTRONIC SHUTTER | -1EV STEP | -0.7EV STEP | WITHOUT LIMITATION | WITHOUT LIMITATION |
| ELECTRONIC FRONT CURTAIN | -2EV STEP | -1EV STEP | WITHOUT LIMITATION | WITHOUT LIMITATION |
| MECHANICAL SHUTTER | -2.6EV STEP | -1.5EV STEP | WITHOUT LIMITATION | WITHOUT LIMITATION |
| | SPEEDUP : ON | | SPEEDUP : OFF | |

IMAGE PICKUP APPARATUS CAPABLE OF SUPPRESSING OCCURRENCE OF EXPOSURE DEVIATION WITHIN IMAGE WHILE SPEEDING UP STROBE SYNCHRONIZATION MAXIMUM SHUTTER SPEED, CONTROL METHOD FOR IMAGE PICKUP APPARATUS, AND STORAGE MEDIUM

BACKGROUND

Technical Field

The aspect of the embodiments relates to an image pickup apparatus, a control method for the image pickup apparatus, and a storage medium, and more particularly to control of a light emission amount and a shutter speed during strobe photographing.

Description of the Related Art

A technique for speeding up a strobe synchronization maximum shutter speed when performing strobe photographing with an image pickup apparatus has been known. The strobe synchronization maximum shutter speed refers to the fastest shutter speed among shutter speeds at which photographing is capable of being performed with a front curtain and a rear curtain open while light is emitted by a strobe, in a shutter method in which photographing is performed by causing the front curtain that causes to start an exposure and the rear curtain that causes to end the exposure to travel. For example, Japanese Laid-Open Patent Publication (kokai) No. 2008-060640 discloses an image pickup apparatus that speeds up the strobe synchronization maximum shutter speed by making the time of an electronic shutter used as the front curtain shorter than the time of a mechanical shutter used as the rear curtain.

In the image pickup apparatus disclosed in Japanese Laid-Open Patent Publication (kokai) No. 2008-060640, since the traveling time of the front curtain and the traveling time of the rear curtain are different, the exposure time changes between the upper portion and the lower portion of the photographed image due to the difference in the traveling times of the front curtain and the rear curtain, resulting in a problem of an exposure deviation between the top and the bottom of the photographed image.

SUMMARY

According to a first aspect of the embodiments, there is provided an image pickup apparatus comprising a strobe light emitting unit, a shutter configured to include a front curtain and a rear curtain that control exposure to an image pickup device, at least one processor, and a memory coupled to the processor storing instructions that, when executed by the processor, cause the processor to function as a setting unit that sets a light emission amount of the strobe light emitting unit, and wherein the setting unit sets, based on a traveling time of the front curtain, an upper limit value of the light emission amount when performing strobe synchronization photographing at a strobe synchronization maximum shutter speed.

Further features of the disclosure will become apparent from the following description of exemplary embodiments with reference to the attached drawings.

BRIEF DESCRIPTION OF THE DRAWINGS

FIG. 5A and FIG. 5B are diagrams that show an example of the relationship between a shutter type and the strobe synchronization maximum shutter speed, and an example of the corresponding light emission amount upper limit value, for each size of an image pickup device.

DESCRIPTION OF THE EMBODIMENTS

Figure 1:
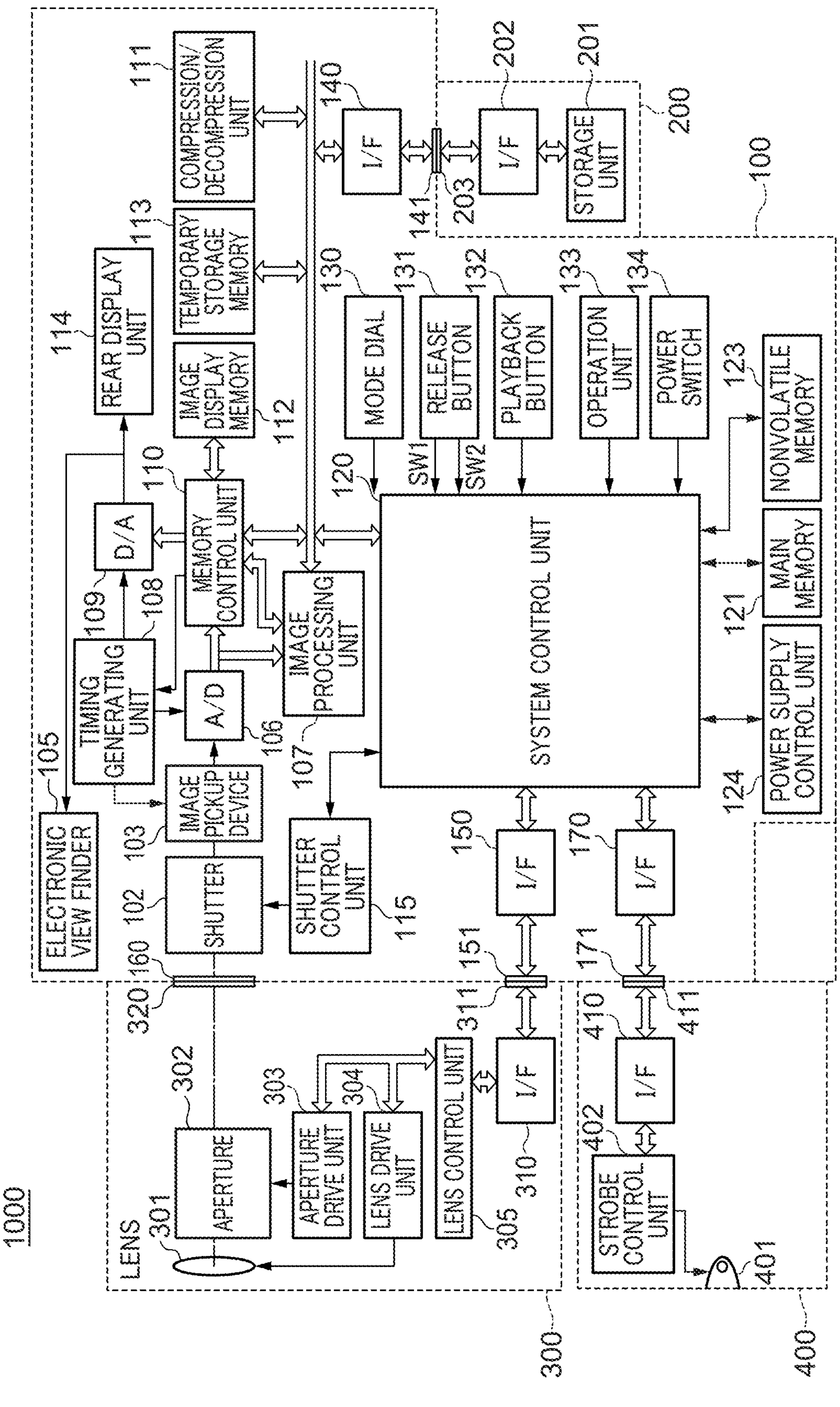
FIG. 1 is a block diagram that shows a schematic configuration of an image pickup system according to an embodiment.

Hereinafter, embodiments will be described in detail with reference to the attached drawings. Note, the following embodiments are not intended to limit the scope of the claimed disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

Here, as an image pickup system according to the present disclosure, a configuration, in which a lens barrel (an interchangeable lens) and a strobe device (a lighting device) have been attached to an image pickup apparatus such as a digital camera, will be taken up.

Here, in the present description, it is assumed that the image pickup apparatus refers to an image pickup apparatus main body equipped with an image pickup device. However, for the sake of convenience, it is assumed that an apparatus in which a photographing lens (a lens unit) is integrally configured with the apparatus main body, such as a compact digital camera or a digital video camera, is included in the image pickup apparatus.

FIG. 1 is a block diagram that shows a schematic configuration of an image pickup system 1000 according to an embodiment. The image pickup system 1000 includes an image pickup apparatus 100, a lens barrel 300 and a strobe device 400 that have been attached to the image pickup apparatus 100, and an external storage medium 200 that has been housed in the image pickup apparatus 100.

The image pickup apparatus 100 is specifically a digital camera, and in the present embodiment, is assumed to be a mirrorless type digital single-lens camera.

The image pickup apparatus 100 includes a lens mount 160, an image pickup device 103, a shutter 102, a shutter control unit 115, an A/D conversion unit 106, an image processing unit 107, a memory control unit 110, a D/A conversion unit 109, an image display memory 112, and a temporary storage memory 113. In addition, the image pickup apparatus 100 includes a compression/decompression unit 111, a timing generating unit 108, an electronic view finder 105, a rear display unit 114, a system control unit 120, a main memory 121, a nonvolatile memory 123, an operation unit 133, a mode dial 130, and a release button 131. Furthermore, the image pickup apparatus 100 includes a playback button 132, a power switch 134, a power supply control unit 124, a first camera interface (a first camera I/F) 140, a second camera I/F 150, a third camera I/F 170, a first camera connector 141, a second camera connector 151, and a third camera connector 171.

The external storage medium 200 includes a medium connector 203, a medium I/F 202, and a storage unit 201.

The lens barrel 300 includes a camera mount 320, a lens connector 311, a lens I/F 310, an image pickup lens group 301, an aperture 302, an aperture drive unit 303, a lens drive unit 304, and a lens control unit 305.

The strobe device 400 includes a strobe connector 411, a strobe I/F 410, a strobe control unit 402, and a strobe light emitting unit 401.

In the image pickup apparatus 100, the image pickup device 103 is, for example, a charge accumulation type photoelectric conversion device such as a CMOS. An optical image of a subject that is incident through the lens barrel 300 and is formed on an image pickup surface of the image pickup device 103 is converted into analog image signals by photoelectric conversion, and the generated analog image signals are outputted to the A/D conversion unit 106.

The shutter 102 includes a front curtain and a rear curtain, which are mechanical components, and an actuator that drives the front curtain and the rear curtain, and causes to drive the front curtain and the rear curtain to open or block a light path between the lens barrel 300 and the image pickup device 103. It is should be noted that the shutter 102 is not limited to a mechanical configuration that drives the front curtain and the rear curtain, but is also capable of being realized by an electronic shutter function that resets or reads out image data that has been picked up by the image pickup device 103 by electrical control. The shutter control unit 115 controls the driving of the shutter 102 (the front curtain and the rear curtain) in accordance with commands from the system control unit 120.

The A/D conversion unit 106 converts the analog image signals that have been outputted from the image pickup device 103 into digital image data, and outputs the generated digital image data to the image processing unit 107 and the memory control unit 110. The image processing unit 107 performs various kinds of processes such as a white balance adjustment process and a gradation process with respect to the digital image data that has been transmitted from the A/D conversion unit 106. In addition, the image processing unit 107 is able to perform a process that cuts out a part of an image.

The memory control unit 110 controls writing and reading of various kinds of data obtained from the A/D conversion unit 106, the image processing unit 107, and the compression/decompression unit 111 into and from the image display memory 112 and the temporary storage memory 113.

The image display memory 112 temporarily stores digital image data for display of an image displayed on the electronic view finder 105 or the rear display unit 114. The digital image data for display that has been written into the image display memory 112 is transmitted to the D/A conversion unit 109 via the memory control unit 110. The D/A conversion unit 109 D/A-converts the digital image data for display to generate analog image data for display, and supplies the analog image data for display to the electronic view finder 105 or the rear display unit 114.

The temporary storage memory 113 temporarily stores the image data outputted from the image processing unit 107, image data that has been read from the external storage medium 200, etc., and is also used as a working area for the system control unit 120. The compression/decompression unit 111 reads the image data that has been stored in the temporary storage memory 113, and performs the compression or decompression of the image data by using a predetermined image compression method or a predetermined image decompression method in accordance with various kinds of uses.

The timing generating unit 108 generates operation signals (control signals such as clock signals) to be supplied to the image pickup device 103, the A/D conversion unit 106, the D/A conversion unit 109, etc. In addition, the timing generating unit 108 controls a reset timing of the accumulated charge in the image pickup device 103, thereby controlling the accumulation of the charge in the image pickup device 103.

The electronic view finder 105 and the rear display unit 114 are each configured with a liquid crystal panel, an organic EL panel, or the like, and display a subject image, a menu screen for performing various kinds of settings of the image pickup apparatus 100, etc. The electronic view finder 105 is configured so that a user is able to confirm the display content by making his/her eye in contact with the electronic view finder 105, and the rear display unit 114 is provided on the rear surface of the image pickup apparatus 100 via a vari-angle mechanism or a tilt mechanism.

The system control unit 120 controls not only the image pickup apparatus 100 but also the overall operation of the image pickup system 1000. Here, a specific example will be described, but the processing executed by the system control unit 120 is not limited to the following specific example.

The system control unit 120 performs a photometry calculation by using the image data obtained by the image pickup device 103, calculates a luminance value of the subject (obtains luminance information), and decides an exposure condition of the image pickup device 103. Parameters that decide the exposure condition include, for example, an aperture value, a shutter speed, and a photographing sensitivity (an ISO sensitivity). In this way, appropriate exposure with respect to the image pickup device 103 is controlled. In addition, the system control unit 120 performs position control (focus control) of the image pickup lens group 301 of the lens barrel 300 so as to focus on the subject, based on a focus detection result for the subject. It should be noted that methods for the focus control include, for example, a contrast method, a phase difference method, and an image pickup plane phase difference method.

The system control unit 120 (a setting unit) issues an instruction to the strobe control unit 402 in accordance with the result of the photometry calculation, the exposure condition, and the state of the strobe device 400 to control a light emission amount and a light emission timing of the strobe light emitting unit 401. The system control unit 120 controls, in particular, the shutter 102 when performing still image photographing, and controls, in particular, the image pickup device 103 when obtaining a live view image or when performing moving image photographing, thereby controlling a charge accumulation time in the image pickup device 103.

The system control unit 120 performs control to display a live view image for confirming the subject on the electronic view finder 105 or the rear display unit 114 during the still image photographing or the moving image photographing. In addition, the system control unit 120 detects the presence or absence of flicker in a photographing environment and its frequency by using the image data obtained by the image pickup device 103.

The system control unit 120 controls the start and the end of moving image recording in response to input signals from the operation unit 133, and is also able to switch an image pickup range of the image pickup device 103 to perform photographing using the pixel output of the entire image pickup surface or photographing that cuts out a portion of the pixel output of the entire image pickup surface. For example, the user is able to switch between photographing an image in full size and photographing an image in a range of APS-C size. In the case of performing photographing by cutting out a portion of the image pickup surface, the image processing unit 107 may cut out a portion of the output from pixels on the entire image pickup surface, or may take pixel signals out from only a partial area of the image pickup surface.

Returning to the description of the other components of the image pickup apparatus 100. The main memory 121 is, for example, a read only memory (a ROM), and stores data related to the operations of the image pickup apparatus 100, such as information regarding the appropriate exposure for the luminance value (table data and program diagrams), constants for the operations executed by the image pickup apparatus 100, various kinds of exposure conditions, and calculation expressions. In addition, the main memory 121 is used to store a light emission amount upper limit value of the strobe light emitting unit 401, a strobe synchronization maximum shutter speed, and a setting relating to a front curtain traveling time. The nonvolatile memory 123 is, for example, an EEPROM or the like that is electrically erasable and programmable, and stores various kinds of setting values of the image pickup system 1000.

The operation unit 133 includes buttons, switches, dials, a touch panel, a line-of-sight detection device, a voice recognition device, or a combination of these, which input various kinds of operation instructions to the system control unit 120. It should be noted that operation members included in the operation unit 133 are operation members other than the mode dial 130, the release button 131, the playback button 132, and the power switch 134, which are separately shown in FIG. 1.

The mode dial 130 is a rotary operation member that is used to set an arbitrary photographing mode from among a plurality of photographing modes that are capable of being set in the image pickup apparatus 100. In the image pickup apparatus 100, it is possible to set a still image photographing mode for photographing still images and a moving image photographing mode for recording moving images. Furthermore, in each of the still image photographing mode and the moving image photographing mode, various kinds of modes are available in which exposure parameters are capable of being set automatically or manually, such as full auto, program, aperture priority, shutter speed priority, and manual, and it is also possible to set whether or not to use a flash (a strobe) when performing still image photographing.

The release button 131 is an operation member for instructing the start of a photographing preparation operation for still image photographing or moving image photographing, or the start of main photographing (actual photographing). The release button 131 causes to generate an SW1 signal by a first stroke (half-pressing), and when the system control unit 120 detects the SW1 signal, the system control unit 120 starts the photographing preparation operation. In the photographing preparation operation, the focus control, exposure control, an auto white balance process (an AWB process), etc. are performed as necessary. The release button 131 causes to generate an SW2 signal by a second stroke (full-pressing). When the system control unit 120 detects the SW2 signal, a series of processes (a photographing processing) from an exposure process with respect to the image pickup device 103 to a storage process of the image data in the external storage medium 200 are executed.

The playback button 132 is an operation member for instructing the start of a playback process in which image data is read out from the temporary storage memory 113 or the external storage medium 200 and is displayed on the rear display unit 114. The power switch 134 is an operation member that switches turning on/turning off the supply of power from a power supply unit (not shown) such as a battery to each unit of the image pickup apparatus 100. It should be noted that when the power switch 134 is turned on, the power is capable of being supplied not only to the image pickup apparatus 100 but also to the lens barrel 300, the external storage medium 200, and the strobe device 400.

The operation unit 133 is used for displaying a menu on the rear display unit 114, for performing various kinds of settings related to image pickup conditions in the image pickup system 1000, and for performing various kinds of settings related to the playback of the photographed still image or the photographed moving image. Here, a specific example will be described, but operations that are capable of being executed by the operation unit 133 are not limited to the following specific example.

For example, the user is able to perform various kinds of settings in strobe photographing, settings for a shutter time, an aperture, and an ISO during photographing, a setting regarding the presence or absence of flicker, a setting for a photographing range, etc. As a specific example, it is possible to switch the image pickup range by performing a setting for still image crop/aspect. The image pickup range includes, for example, "full size", which performs image pickup by using the entire image pickup surface of the image pickup device 103, and "crop" that cuts out (crops) from full size at a ratio such as [16:9], [4:3], or [1:1], and picks up only the range of APS-C. It should be noted that the image pickup range may be configured to automatically switch in response to information from the lens barrel 300.

In addition, the user is able to select and set a shutter type from among an electronic shutter, an electronic front curtain, and a mechanical shutter. In the case where the electronic shutter has been set, the system control unit 120 performs the control of the front curtain and the rear curtain by resetting or reading out the electric charge in each pixel of the image pickup device 103. When the mechanical shutter is set, the system control unit 120 performs the control of the front curtain and the rear curtain by operating an oblique lighting member together with the control of the front curtain and the rear curtain. When the electronic front curtain is set, the system control unit 120 controls the front curtain by resetting the electric charge in each pixel of the image pickup device 103, and controls the rear curtain by operating the oblique lighting member.

The user is able to perform a setting for so-called electronic zoom (including a setting for electronic teleconverter) that cuts out a portion of the image pickup surface of the image pickup device 103, enlarges it, and records it. Specifically, it is possible to set turning on/turning off the electronic zoom and a zoom magnification of the electronic zoom.

The user is able to perform a setting for turning on/turning off electronic image stabilization and a setting for an image stabilization strength in the electronic image stabilization. The electronic image stabilization changes the position at which an image picked up by the image pickup device 103 is cut out in accordance with the amount of shake, and the greater the image stabilization strength, the smaller the cut-out size of the image.

In addition, the user is able to perform a setting for high dynamic range photographing (HDR photographing), which allows images with a wide dynamic range to be obtained by amplifying pixel signals with different gains. In the HDR photographing, a drive mode of the image pickup device 103 is set to a dual gain output mode (a DGO mode) or a dual slope mode (a DS mode).

Returning to the description of the other components of the image pickup apparatus 100. The power supply control unit 124 includes a battery detection circuit (not shown), a DC-DC converter (not shown), a switch circuit that is used to switch between blocks to be energized (not shown), etc., and controls the power supply from the power supply unit to each unit of the image pickup apparatus 100. The power supply control unit 124 detects whether or not a battery has been attached, the type of the battery, and the remaining battery level based on an instruction from the system control unit 120 in response to the operation of the power switch 134, and supplies a required voltage to each unit of the image pickup system 1000 for a required period of time.

The first camera I/F 140 is an interface for connecting the system control unit 120 and the external storage medium 200 so that they are capable of communicating with each other. The second camera I/F 150 is an interface for connecting the system control unit 120 and the lens control unit 305 so that they are capable of communicating with each other. The third camera I/F 170 is an interface for connecting the system control unit 120 and the strobe control unit 402 so that they are capable of communicating with each other. The lens mount 160 is a mount portion on the image pickup apparatus 100 side that mechanically connects the lens barrel 300 and the image pickup apparatus 100 by being engaged with the camera mount 320 of the lens barrel 300.

The first camera connector 141 is connected to the medium connector 203 of the external storage medium 200. As a result, the image pickup apparatus 100 and the external storage medium 200 are electrically connected to each other to enable the transmission of various kinds of control signals, the image data, etc., and also enable the supply of the power from the image pickup apparatus 100 to the external storage medium 200. The second camera connector 151 is connected to the lens connector 311. As a result, the image pickup apparatus 100 and the lens barrel 300 are electrically connected to each other to enable the transmission of various kinds of control signals, various kinds of state signals, various kinds of data signals, etc., and also enable the supply of the power from the image pickup apparatus 100 to the lens barrel 300. The third camera connector 171 is connected to the strobe connector 411. As a result, the image pickup apparatus 100 and the strobe device 400 are electrically connected to each other to enable the transmission of various kinds of control signals, various kinds of state signals, various kinds of data signals, etc., and also enable the supply of the power from the image pickup apparatus 100 to the strobe device 400. It should be noted that the second camera connector 151 and the third camera connector 171 may be configured to be capable of performing optical communication, voice communication, and/or the like in addition to electrical communication.

The external storage medium 200 is a memory card, a hard disk, or the like, and the storage unit 201 is a semiconductor memory, a magnetic disk, or the like. The medium connector 203 is electrically connected to the first camera connector 141 of the image pickup apparatus 100. The medium I/F 202 is an interface for connecting the external storage medium 200 and the system control unit 120 so that they are capable of communicating with each other.

The lens barrel 300 is attachable to and detachable from the image pickup apparatus 100, and is an optical device that causes to form an optical image of a subject on the image pickup device 103. The camera mount 320 is a mount portion on the lens barrel 300 side that mechanically connects the lens barrel 300 and the image pickup apparatus 100 by being engaged with the lens mount 160 of the image pickup apparatus 100. The lens connector 311 is provided inside the camera mount 320, and electrically connects the lens barrel 300 and the image pickup apparatus 100. The lens connector 311 may be configured to be capable of performing optical communication, voice communication, and/or the like in addition to electrical communication, in accordance with the configuration of the second camera connector 151. The lens I/F 310 is an interface for connecting the lens control unit 305 and the system control unit 120 so that they are capable of communicating with each other.

The lens control unit 305 comprehensively controls each unit of the lens barrel 300 in accordance with commands from the system control unit 120. It should be noted that the lens control unit 305 has retained information such as constants for operation, variables for operation, programs for operation, identification information (a manufacturing ID) of the lens barrel 300, management information, a maximum aperture value, a minimum aperture value, and a focal length.

The image pickup lens group 301 includes a plurality of lenses such as a focus lens, a zoom lens, and an image stabilization lens, and causes incident light to form an image on the image pickup surface of the image pickup device 103. In accordance with instructions from the lens control unit 305, the lens drive unit 304 adjusts the positions of the focus lens and the zoom lens in an optical axis direction, and also drives the image stabilization lens within a plane perpendicular to the optical axis. The aperture 302 adjusts the amount of a light flux on the subject that passes through the image pickup lens group 301 and enters the image pickup device 103 side. It should be noted that the aperture 302 and the shutter 102 are capable of being controlled in conjunction with each other. The aperture drive unit 303 adjusts an opening amount of the aperture 302 in accordance with an instruction from the lens control unit 305.

The strobe device 400 is attachable to and detachable from the image pickup apparatus 100, and emits a flash of light (strobe light) to a subject in accordance with the photographing environment. The strobe connector 411 is electrically connected to the third camera connector 171. The strobe connector 411 may be configured to be capable of performing optical communication, voice communication, and/or the like in addition to electrical communication, in accordance with the configuration of the third camera connector 171. The strobe I/F 410 is an interface for connecting the strobe control unit 402 and the system control unit 120 so that they are capable of communicating with each other. The strobe light emitting unit 401 is, for example, a xenon tube or the like. The strobe control unit 402 performs light emission control in the strobe light emitting unit 401 in accordance with commands from the system control unit 120. It should be noted that the strobe control unit 402 has retained information such as constants for operation, variables for operation, programs for operation, identification information (a manufacturing ID) of the strobe device 400, a guide number, and a color temperature. It is possible to perform various kinds of settings of the strobe device 400 by operating an operation unit (not shown) provided in the strobe device 400 and/or by communication from the image pickup apparatus 100.

It should be noted that each of the processing blocks such as the system control unit 120, the image processing unit 107, the strobe control unit 402, the lens control unit 305, etc., which is capable of being realized by hardware such as an application specific integrated circuit (an ASIC) or a programmable logic array (a PLA). Without being limited to this, each of the processing blocks may be realized by a programmable processor such as a central processing unit (a CPU) or a microprocessor unit (an MPU) executing software (by a combination of software and hardware). In other words, the same hardware may be configured to function as a plurality of functional blocks.

Next, a processing of updating the strobe synchronization maximum shutter speed (a strobe synchronization maximum shutter speed update processing) that is executed by the image pickup apparatus 100 will be described. Since the present embodiment does not include control that does not synchronize the strobe light emission and the shutter operation during strobe photographing, in the following description, the strobe synchronization maximum shutter speed will be abbreviated to "a synchronization maximum speed".

By operating the operation unit 133, the user is able to set whether or not to cause to emit a flash of light (strobe light) when performing still image photographing, and set a shutter speed (a shutter time), etc. when performing strobe synchronization photographing, and is also able to perform a setting for speedup of the synchronization maximum speed (a speedup setting for speeding up the synchronization maximum speed).

In the present embodiment, in the case where the speedup of the synchronization maximum speed is enabled, compared to the case where the speedup of the synchronization maximum speed is disabled, it is assumed that the synchronization maximum speed is speeded up by only ⅓EV step (0.33 EV). At this time, an upper limit value of the light emission amount of the strobe light emitting unit 401 is set, and the synchronization maximum speed is speeded up by limiting the light emission amount. It should be noted that ⅓EV step is just an example, and may be a different EV step other than ⅓EV step.

The system control unit 120 stores the light emission amount upper limit value of the strobe light emitting unit 401 in the main memory 121, clips a strobe light emission amount when performing strobe synchronization photographing at the light emission amount upper limit value that has been stored, and transmits the clipped light emission amount to the strobe device 400 (the strobe control unit 402). The strobe control unit 402 limits the amount of light emitted by the strobe light emitting unit 401 (the light emission amount of the strobe light emitting unit 401) by making the strobe light emitting unit 401 emit light in accordance with the received light emission amount.

Figure 2A:
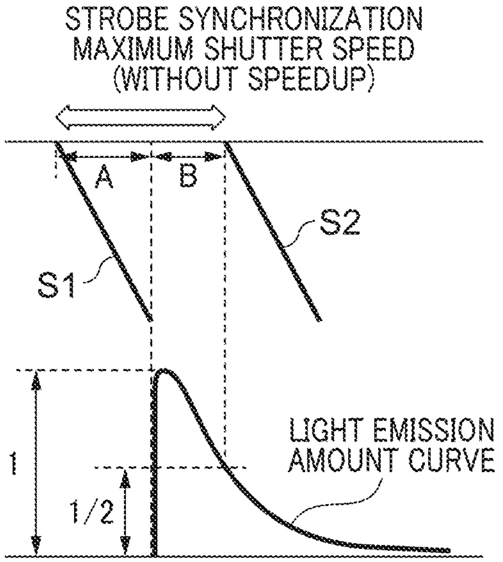
FIG. 2A and FIG. 2B are diagrams for explaining speedup of a strobe synchronization maximum shutter speed.
Figure 2B:
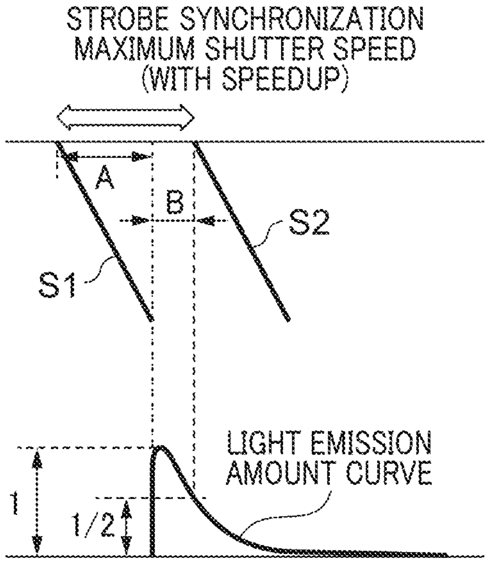

FIG. 2A and FIG. 2B are diagrams for explaining the speedup of the synchronization maximum speed. FIG. 2A is a diagram that shows the relationship between the synchronization maximum speed and the light emission amount in the case where the synchronization maximum speed is not speeded up, and FIG. 2B is a diagram that shows the relationship between the synchronization maximum speed and the light emission amount in the case where the synchronization maximum speed is speeded up. In each of FIG. 2A and FIG. 2B, 'S1' schematically represents front curtain traveling of the shutter 102, and 'S2' schematically represents rear curtain traveling of the shutter 102. In each of FIG. 2A and FIG. 2B, a gradient of the front curtain traveling S1 (a front curtain traveling speed) and a gradient of the rear curtain traveling S2 (a rear curtain traveling speed) are the same.

In the case where the shutter 102 is a mechanical shutter, exposure to the image pickup device 103 is started by the front curtain traveling S1 of the shutter, and light is blocked by the rear curtain traveling S2 of the shutter. In the case where the shutter 102 is an electronic shutter, the charge accumulated in the horizontal direction of the image pickup device 103 is reset by front curtain control, and the charge accumulated in the pixels of each row of the image pickup device 103 is read out sequentially by rear curtain control.

In each of FIG. 2A and FIG. 2B, a period 'A' represents a traveling time of the front curtain of the shutter 102. In each of FIG. 2A and FIG. 2B, a light emission amount curve shows a change in the light emission amount over time when the strobe light emission is performed. Here, the maximum value of the light emission amount is represented as '1', and the light amount at which the light emission amount becomes half of the peak is represented as '½', and the time until the light emission amount falls to half of the peak is defined as "a strobe light emission period". Therefore, the strobe light emission period is represented by 'B' in both FIG. 2A and FIG. 2B, and if the strobe light emission period is a state in which both the front curtain and the rear curtain are open, it can be said that strobe synchronization has been achieved.

In both FIG. 2A and FIG. 2B, the rear curtain traveling starts immediately after the strobe light emission period B ends, and the strobe synchronization has been achieved. The charge accumulation time in the image pickup device 103 is represented as 'A+B', and the charge accumulation time A+B becomes the synchronization maximum speed. In contrast to the example of FIG. 2A in which the synchronization maximum speed is not speeded up, in the example of FIG. 2B, the synchronization maximum speed is speeded up by reducing the light emission amount and shortening the strobe light emission period B.

Figure 3:
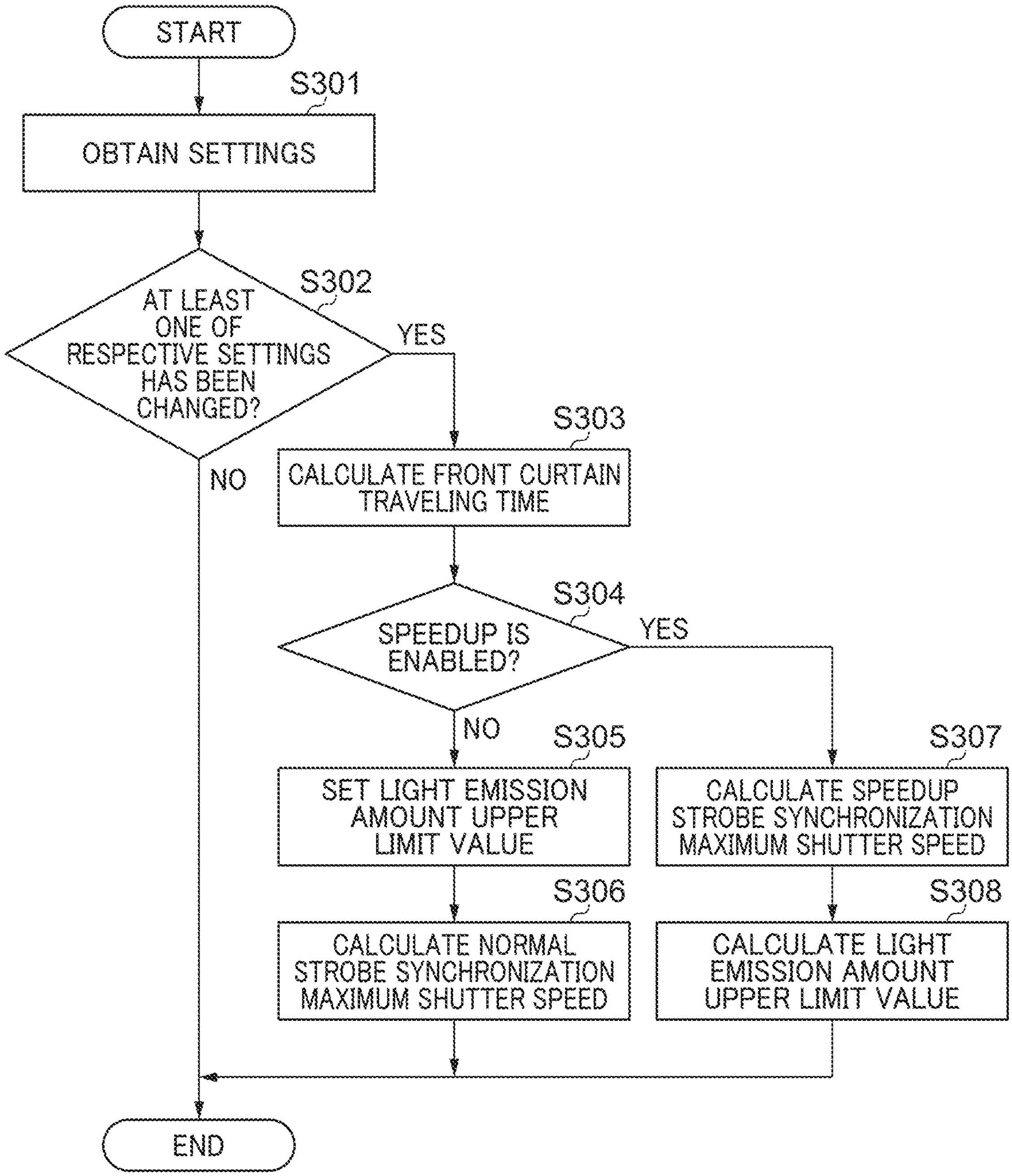
FIG. 3 is a flowchart of a strobe synchronization maximum shutter speed update processing.

FIG. 3 is a flowchart of the strobe synchronization maximum shutter speed update processing (a synchronization maximum speed update processing). Respective processes (respective steps) indicated by S numbers in the flowchart of FIG. 3 are realized by the system control unit 120 executing a predetermined program to comprehensively control the operations of the respective units of the image pickup system 1000.

In S301, the system control unit 120 obtains setting values (settings) required for updating the synchronization maximum speed. The settings to be obtained in S301 include, for example, the setting for speeding up the synchronization maximum speed, the setting for the shutter type, the setting for the still image crop/aspect, the setting for the electronic zoom, the setting for the electronic image stabilization, and the setting for the HDR photographing.

In S302, the system control unit 120 determines whether or not at least one of the respective settings obtained in S301 has been changed. For example, the setting values that have been used in the determination process in last time S302 can be stored in the main memory 121, and compared with the latest settings obtained in the most recent S301 to determine whether or not there have been any changes to the respective settings.

In the case where the system control unit 120 determines that none of the respective settings obtained in S301 have been changed (NO in S302), the system control unit 120 ends the synchronization maximum speed update processing. On the other hand, in the case where the system control unit 120 determines that at least one of the respective settings obtained in S301 has been changed (YES in S302), the system control unit 120 executes the process of S303.

In S303, the system control unit 120 calculates the front curtain traveling time. The front curtain traveling time is the period indicated by 'A' in FIG. 2A and FIG. 2B, and takes a value corresponding to the setting that has been obtained in S301. In other words, the front curtain traveling time changes depending on the change in the setting that has been obtained in S301.

For example, in the case of the electronic shutter type, the time required to reset the charge of the image pickup device 103 becomes the front curtain traveling time, and in the case of the mechanical shutter type, the time until the operation of the oblique lighting member of the shutter 102 is completed becomes the front curtain traveling time. In the case of the electronic shutter type, the reset speed of the image pickup device 103 is directly linked to the front curtain traveling time, so that it becomes necessary to take into consideration the drive mode of the image pickup device 103.

In addition, the setting for turning on/turning off the HDR photographing significantly affects the drive mode when the accumulated charge is read out from the pixels of the image pickup device 103. In the HDR photographing, a dual slope drive mode or the like is used to expand the dynamic range by utilizing signals read out from the image pickup device 103 at different sensitivities. In the case where the image pickup device 103 is operated in such a special drive mode, the reset speed of the image pickup device 103 may change, and therefore it is necessary to calculate the front curtain traveling time taking into consideration the setting for the HDR photographing.

Furthermore, with regard to the still image crop/aspect, for example, in the case of "full size" in which the entire image pickup surface of the image pickup device 103 is photographed, and in the case of "crop" in which only the range of APS-C is photographed, the latter requires a shorter front curtain traveling time. In addition, in the latter case, the range to be exposed is narrower in the mechanical shutter type, and the range to reset the image signals is narrower in the electronic shutter type, so the front curtain traveling time becomes shorter. In this way, it is necessary to calculate the front curtain traveling time taking into consideration the photographing range corresponding to the setting for the still image crop/aspect.

In the electronic zoom, the narrower the range from which signals are taken out from the image pickup surface of the image pickup device 103, the shorter the front curtain traveling time required. In other words, since the greater the zoom magnification of the electronic zoom, the shorter the front curtain traveling time becomes, it is necessary to calculate the front curtain traveling time taking into consideration the setting for the electronic zoom.

In the electronic image stabilization, a part of the image picked up by the image pickup device 103 is cut out, and therefore the front curtain traveling time changes in accordance with the cut-out range. The greater the image stabilization strength, the narrower the cut-out range and the shorter the front curtain traveling time. Therefore, it is necessary to calculate the front curtain traveling time taking into consideration the setting for the electronic image stabilization.

In this way, in S303, the front curtain traveling time is calculated taking into consideration the influence caused by a change in the photographing range depending on the setting for the shutter type, the setting for turning on/turning off the HDR photographing, the setting for the still image crop/aspect, the setting for the electronic zoom, and the setting for the electronic image stabilization.

In S304, the system control unit 120 determines whether or not the speedup of the synchronization maximum speed is enabled, based on the settings that have been obtained in S301. In the case where the system control unit 120 determines that the speedup of the synchronization maximum speed is disabled (NO in S304), the system control unit 120 executes the process of S305.

In S305, the system control unit 120 sets the light emission amount upper limit value to a full light emission value, and stores it in the main memory 121. It should be noted that permitting full light emission means that the light emission amount is not limited.

In S306, the system control unit 120 calculates a normal synchronization maximum speed, which is a shutter speed in the case where the synchronization maximum speed is not speeded up. The normal synchronization maximum speed is obtained by adding the front curtain traveling time that has been calculated in S303 and a strobe light emission period with the full light emission that has been set in S305. The system control unit 120 stores the calculated normal synchronization maximum speed in the main memory 121, and ends the synchronization maximum speed update processing. In this way, in the case where the speedup of the synchronization maximum speed becomes disabled, the light emission amount upper limit value and the synchronization maximum speed that have been stored in the main memory 121 are updated by the processes of S305 and S306, and the synchronization maximum speed update processing ends.

In the case where the system control unit 120 determines in the determination process of S304 that the speedup of the synchronization maximum speed is enabled (YES in S304), the system control unit 120 executes the process of S307.

In S307, the system control unit 120 calculates a speedup synchronization maximum speed. The speedup synchronization maximum speed is obtained by adding ⅓EV step (0.33 EV) to the normal synchronization maximum speed that is a synchronization maximum speed in the case where the synchronization maximum speed is not speeded up. The system control unit 120 stores the calculated speedup synchronization maximum speed in the main memory 121. It should be noted that the normal synchronization maximum speed is obtained, as in S306, by adding the front curtain traveling time that has been calculated in S303 and the strobe light emission period with the full light emission.

In S308, the system control unit 120 calculates a maximum light emission amount for which the light emission time falls within a time obtained by subtracting the front curtain traveling time from the speedup synchronization maximum speed that has been obtained in S307, and stores it in the main memory 121 as a light emission amount upper limit value, and ends the synchronization maximum speed update processing.

In this way, in the case where the speedup of the synchronization maximum speed becomes enabled, the light emission amount upper limit value and the synchronization maximum speed that have been stored in the main memory 121 are updated by the processes of S307 and S308, and the synchronization maximum speed update processing ends. It should be noted that as described above, the light emission amount upper limit value and the synchronization maximum speed to be stored in the main memory 121 are updated by the values that have been obtained by the processes of S305 and S306 or the values that have been obtained by the processes of S307 and S308 each time the flow shown in FIG. 3 is performed.

In the present embodiment, since the speedup of the synchronization maximum speed has been realized by setting the light emission amount upper limit value and thereby limiting the strobe light emission amount, it is possible to suppress the occurrence of an exposure deviation between the top and the bottom of a photographed image that is caused by the difference in the traveling times of the front curtain and the rear curtain.

In addition, when the light emission amount is the same under conditions where the synchronization maximum speed is the same but the front curtain traveling time is different, the light emission period and the traveling of the rear curtain will overlap, which may result in uneven brightness at the top and the bottom of the photographed image. With respect to this issue, in the present embodiment, since the light emission amount upper limit value has been set in accordance with the front curtain traveling time, it is possible to avoid this issue.

Figure 4A:
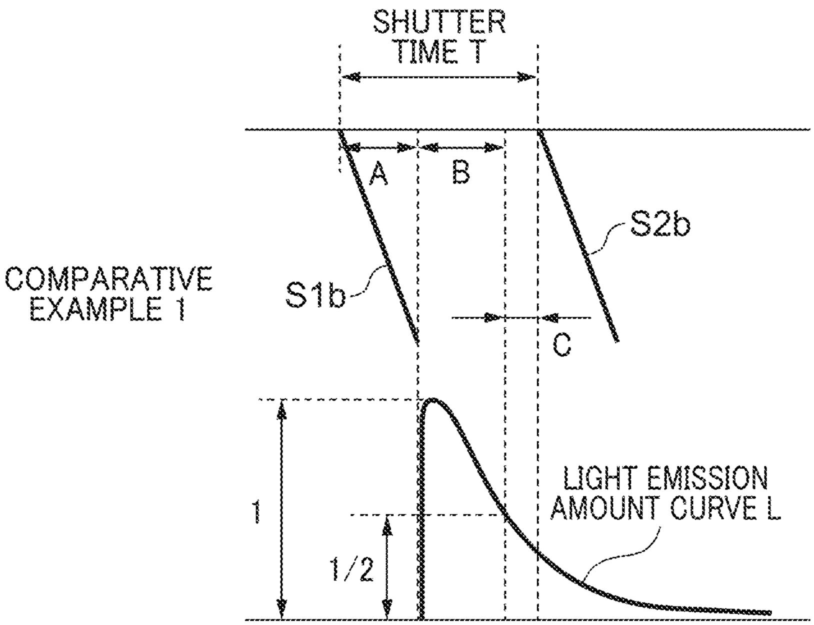
FIGS. 4A, 4B, and 4C are diagrams for explaining the influence of a front curtain traveling speed on exposure in a case where a shutter speed and a light emission amount curve are the same.
Figure 4B:
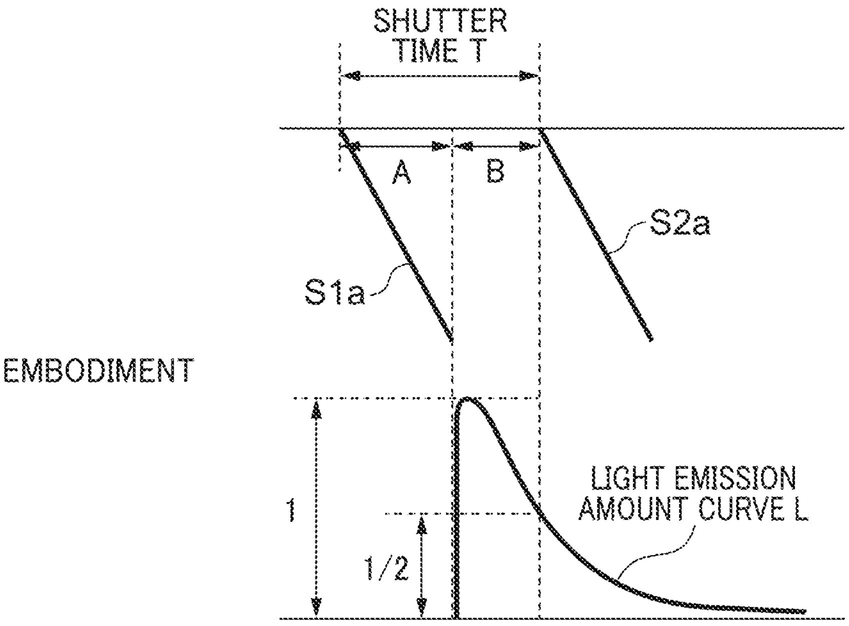
Figure 4C:
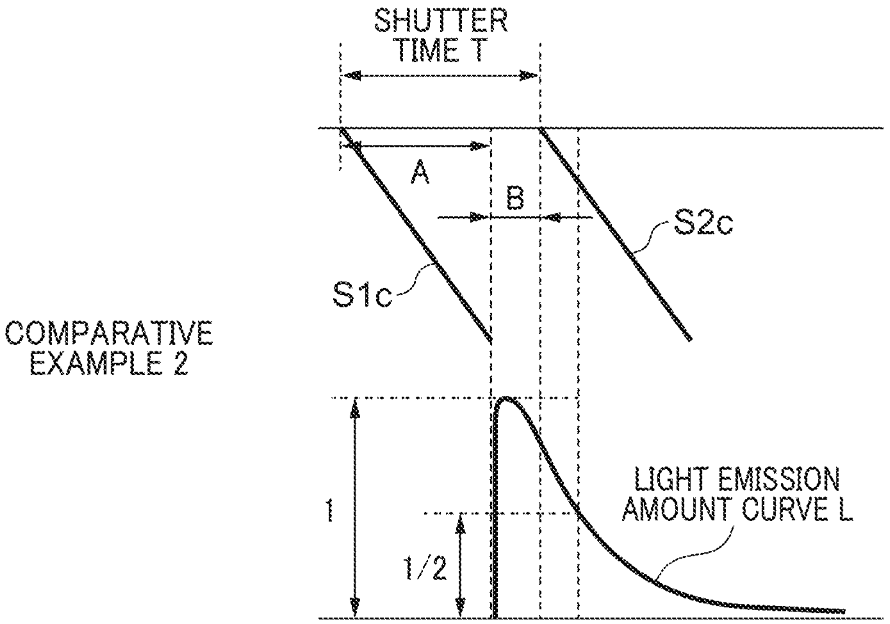

Such an effect will be described with reference to FIGS. 4A, 4B, 4C, 5A, and 5B. FIGS. 4A, 4B, and 4C are diagrams for explaining the influence of the front curtain traveling speed on exposure in the case where the shutter speed (a shutter time T) and the light emission amount curve are the same. FIG. 4B shows an embodiment, FIG. 4A shows comparative example 1, and FIG. 4C shows comparative example 2.

The embodiment of FIG. 4B shows the state where the speedup of the synchronization maximum speed in accordance with a speed of front curtain traveling S1a has been realized. It should be noted that a speed of rear curtain traveling S2a is the same as the speed of the front curtain traveling S1a. In the embodiment of FIG. 4B, light emission is performed at a timing of the end of the front curtain traveling and the traveling of the rear curtain begins when the light emission amount has fallen to half of its peak, making it possible to obtain an image with uniform exposure across the entire image. The synchronization maximum speed (the shutter time T) and a light emission amount curve L in the embodiment of FIG. 4B correspond to, for example, the combination of the full size, the electronic front curtain, and speedup-ON in FIG. 5A and FIG. 5B that will be described below.

FIG. 4A shows the comparative example 1 in which the same shutter time T and the same light emission amount curve L as in FIG. 4B have been applied to front curtain traveling S1b whose speed is faster than the speed of the front curtain traveling S1a. It should be noted that a speed of rear curtain traveling S2b is the same as the speed of the front curtain traveling S1b. In the comparative example 1, the traveling of the rear curtain starts after a time C has elapsed from the point in time when the light emission amount has decreased to ½ (the end of a light emission period B). This indicates that it is possible to further speed up the shutter speed (further shorten the shutter time) by the time C, and/or that it is possible to increase the light emission amount upper limit value without changing the shutter speed.

FIG. 4C shows the comparative example 2 in which the same shutter time T and the same light emission amount curve L as in FIG. 4B have been applied to front curtain traveling S1c whose speed is slower than the speed of the front curtain traveling S1a. It should be noted that a speed of rear curtain traveling S2c is the same as the speed of the front curtain traveling S1c. In the comparative example 2, since the front curtain traveling time is longer than in the embodiment of FIG. 4B, even though the synchronizable light emission period is shortened, light emission is performed according to the same light emission amount curve L as in the embodiment of FIG. 4B, and therefore the traveling of the rear curtain starts before the light emission amount falls to half of its peak. As a result, not all of the strobe light reaches the upper part of the screen during the exposure period thereof, and the latter half of the light emission is blocked, resulting in an image to be photographed in which the upper part of the screen is darker than the lower part of the screen.

In this way, in the present embodiment, since the synchronization maximum speed is decided in accordance with the front curtain traveling time and the light emission amount upper limit value is calculated in accordance with the decided synchronization maximum speed, by appropriately setting the synchronization maximum speed and the light emission amount upper limit value, it is possible to obtain an image without uneven exposure.

FIG. 5A is a diagram that shows an example of the relationship between the shutter type and the synchronization maximum speed for each size of the image pickup device. FIG. 5B is a diagram that shows an example of a light emission amount upper limit value that is set corresponding to FIG. 5A.

The image pickup device is assumed to be full size, and examples are given of a case where photographing is performed in full size and a case where photographing is performed after cropping to APS-C size. As the shutter type, an electronic shutter, an electronic front curtain, and a mechanical shutter are taken up. Here, it is assumed that a front curtain traveling speed of the electronic shutter is faster than a front curtain traveling speed of the mechanical shutter, and in this case, in the case where the electronic shutter is used, it is possible to further speed up the synchronization maximum speed (further shorten the shutter time) than the case where the mechanical shutter is used. A front curtain traveling speed of the electronic front curtain is basically matched to the curtain speed of the mechanical shutter, but there is room to shorten the front curtain traveling time by optimizing a front curtain traveling curve compared to the mechanical shutter. For this reason, here, the front curtain traveling speed of the electronic front curtain is faster than the front curtain traveling speed of the mechanical shutter, and therefore, in terms of the synchronization maximum speed, in the case where the electronic front curtain is used, it is slower than the case where the electronic shutter is used, but it is possible to further speed up the synchronization maximum speed than the case where the mechanical shutter is used.

In the case where the image pickup device is full size, the normal synchronization maximum speeds (speedup: OFF) are 1/320, 1/250, and 1/200 for the electronic shutter, the electronic front curtain, and the mechanical shutter, respectively. In the case where photographing is performed after cropping to the APS-C size, the front curtain traveling time is shorter than the case where photographing is performed in the full size. Therefore, the normal synchronization maximum speeds (speedup: OFF) are 1/400, 1/320, and 1/250 for the electronic shutter, the electronic front curtain, and the mechanical shutter, respectively.

The speedup synchronization maximum speed (the synchronization maximum speed in the case where the synchronization maximum speed has been speeded up (speedup: ON)) is set to a shutter speed that is 1/3EV step faster than the case where the synchronization maximum speed has not been speeded up. Therefore, the speedup synchronization maximum speeds in the case of the full size are 1/400, 1/320, and 1/250 for the electronic shutter, the electronic front curtain, and the mechanical shutter, respectively. In addition, the speedup synchronization maximum speeds in the case of the APS-C size are 1/500, 1/400, and 1/320 for the electronic shutter, the electronic front curtain, and the mechanical shutter, respectively.

In terms of the light emission amount upper limit value, regardless of the shutter type and whether photographing is performed in the full size or the APS-C size, in the case where the synchronization maximum speed is not speeded up, there is no limit to the light emission amount, in other words, light emission up to the full light emission is permitted.

On the other hand, in the case where the synchronization maximum speed is speeded up, the light emission amount upper limit value is limited to a light emission amount that is obtained by dropping a predetermined EV step shown in FIG. 5B from a value of the full light emission (the full light emission value). For example, in the case where the speedup of the synchronization maximum speed is performed in the electronic shutter during photographing in the full size, the light emission amount upper limit value is set to a light emission amount that is obtained by dropping 1 EV step from the full light emission value. More specifically, from FIG. 5A, the synchronization maximum speed in the case of using the electronic shutter in the full size is set to 1/400. Since a time obtained by subtracting the front curtain traveling time from the charge accumulation time in the case where the synchronization maximum speed has been set to 1/400 becomes a time when both the front curtain and the rear curtain are open, the upper limit of the light emission amount is set to a value obtained by dropping 1 EV step from the full light emission value (−1 EV step from the full light emission value) so that the light emission falls in this time. It should be noted that the settings for the light emission amount upper limit value under other photographing conditions are able to being dealt with in the same manner as the above-described example of the full size and the electronic shutter, so descriptions thereof will be omitted. In addition, the numerical values and their magnitude relationships shown in FIG. 5A and FIG. 5B are merely examples and may differ depending on the performance of the image pickup system, and the numerical values shown in FIG. 5A and FIG. 5B do not limit the present disclosure.

As described above, the image pickup apparatus 100 is able to select one shutter type from among the electronic shutter, the electronic front curtain, and the mechanical shutter. Here, it is assumed that the synchronization maximum speed in the full size for all shutter types is 1/250 in the case where the speedup is turned off and is 1/320 in the case where the speedup is turned on, without taking into consideration the front curtain traveling speed. In this case, when the synchronization maximum speed is speeded up, for example, it is conceivable that when the electronic shutter is set, the state shown in FIG. 4A will result, when the electronic front curtain is set, the state shown in FIG. 4B will result, and when the mechanical shutter is set, the state shown in FIG. 4C will result. In other words, there is a case where all shutter types do not achieve the state shown in FIG. 4B. Therefore, in the present embodiment, the synchronization maximum speed is set for each shutter type based on the front curtain traveling speed, and the light emission amount is limited based on the synchronization maximum speed that has been set, thereby avoiding becoming the state shown in FIG. 4A or the state shown in FIG. 4C.

Although the present disclosure has been described in detail above based on its preferred embodiments, the present disclosure is not limited to these specific embodiments, and various forms within the scope of the gist of the disclosure are also included in the present disclosure. Furthermore, each of the above-described embodiments merely represents one embodiment of the present disclosure, and the above-described embodiments can be appropriately combined.

For example, in the above-described embodiment, the shutter type is selected from among the electronic shutter, the electronic front curtain, and the mechanical shutter, but the shutter types are not limited to the electronic shutter, the electronic front curtain, and the mechanical shutter, and the shutter types may include a global shutter. However, with the global shutter, since the front curtain traveling time does not depend on the photographing range, there is no need to consider the setting for the still image crop/aspect, the setting for the electronic zoom, and the setting for the electronic image stabilization, which will affect the photographing range. In addition, in the case where the front curtain traveling time is capable of being changed in a particular photographing mode, a setting therefor may be obtained in S301, and the processes from S303 onward may be performed by using the set front curtain traveling time.

In the above-described embodiment, the system control unit 120 has calculated the front curtain traveling time and the light emission amount upper limit value from various conditions (the shutter type, and various kinds of settings obtained in S301 that will affect the front curtain traveling speed). Here, in the case where the number of combinations of the various conditions is small, a reference table (a lookup table) that defines the synchronization maximum speed and the light emission amount upper limit value may be stored in the nonvolatile memory 123 or the main memory 121. For example, it is assumed that the image pickup system has specifications in which the electronic zoom, the electronic image stabilization, and the HDR photographing become exclusive functions during the strobe photographing, and the synchronization maximum speed and the light emission amount upper limit value are constant regardless of the still image crop/aspect. In this case, the synchronization maximum speed and the light emission amount upper limit value are defined in the reference table in the same manner as in FIG. 5A and FIG. 5B. In this case, the calculation process of the front curtain traveling time in step S303 is capable of being omitted, and the processes in steps S305 to S308 is capable of being simplified to a process that only looks up the reference table (the lookup table).

For example, in the above-described embodiment, although the configuration, in which the lens barrel 300 and the strobe device 400 are attachable to and detachable from the image pickup apparatus 100, has been taken up, the lens barrel 300 and the strobe device 400 may be configured integrally with the image pickup apparatus 100. In this case, the system control unit 120 also functions as the lens control unit 305 and the strobe control unit 402. In addition, although the configuration, in which the strobe device 400 is physically attached to the image pickup apparatus 100 via the connector, has been described, the strobe device 400 and the image pickup apparatus 100 may be configured to be connected to each other via wireless communication so as to be controllable. Furthermore, the image pickup apparatus 100 constituting the image pickup system according to the present disclosure has been described on the assumption that the image pickup apparatus 100 is a mirrorless type digital camera, but the image pickup apparatus 100 is not limited to be a mirrorless type digital camera, and may be a digital video camera or a portable device such as a smartphone.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., ASIC) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-062067, filed on Apr. 8, 2024, which is hereby incorporated by reference herein in its entirety.

What is claimed is:

1. An image pickup apparatus comprising:

a strobe light emitting unit;

a shutter configured to include a front curtain and a rear curtain that control exposure to an image pickup device;

at least one processor; and a memory coupled to the processor storing instructions that, when executed by the processor, cause the processor to function as a setting unit that sets a light emission amount of the strobe light emitting unit, and wherein the setting unit sets, based on a traveling time of the front curtain, an upper limit value of the light emission amount when performing strobe synchronization photographing at a strobe synchronization maximum shutter speed.

2. The image pickup apparatus according to claim 1, wherein the setting unit sets the upper limit value of the light emission amount in accordance with a shutter type for driving the front curtain and the rear curtain.

3. The image pickup apparatus according to claim 2, wherein the shutter type is an electronic shutter, an electronic front curtain, or a mechanical shutter.

4. The image pickup apparatus according to claim 1, wherein the image pickup device is configured to be controllable in a plurality of drive modes, and the setting unit sets the upper limit value of the light emission amount in accordance with the drive mode.

5. The image pickup apparatus according to claim 4, wherein the setting unit changes the upper limit value of the light emission amount depending on whether or not the drive mode is a mode in which pixel signals outputted from the image pickup device are amplified with different gains.

6. The image pickup apparatus according to claim 1, wherein the setting unit sets the upper limit value of the light emission amount in accordance with a cut-out setting for cutting out a part of a photographed image from the image pickup device.

7. The image pickup apparatus according to claim 1, wherein the setting unit, in a case where a shutter type for driving the front curtain and the rear curtain is a global shutter, sets the upper limit value of the light emission amount based only on the shutter type, and in a case where the shutter type is an electronic shutter, an electronic front curtain, or a mechanical shutter, sets the upper limit value of the light emission amount in accordance with the shutter type and a cut-out setting for cutting out a part of a photographed image from the image pickup device.

8. The image pickup apparatus according to claim 6, wherein the cut-out setting is photographing in full size or photographing in APS-C size, in a case where the image pickup device is full size.

9. The image pickup apparatus according to claim 6, wherein the cut-out setting is turning on/turning off electronic zoom and a zoom magnification in a case where the electronic zoom is turned on.

10. The image pickup apparatus according to claim 6, wherein the cut-out setting is turning on/turning off electronic image stabilization and an image stabilization strength in a case where the electronic image stabilization is turned on.

11. A control method for an image pickup apparatus, the control method comprising:

a step of obtaining setting values that affect a strobe synchronization maximum shutter speed when performing strobe photographing;

a step of calculating a traveling time of a front curtain that controls exposure to an image pickup device based on the setting values; and a light emission amount upper limit value setting step of setting an upper limit value of a strobe light emission amount based on the traveling time of the front curtain.

12. The control method for the image pickup apparatus according to claim 11, wherein the light emission amount upper limit value setting step comprises a step of determining whether a speedup setting for speeding up the strobe synchronization maximum shutter speed is enabled or disabled; and a step of, in a case where the speedup setting is disabled, setting an upper limit of a light emission amount of a strobe device to full light emission and setting the strobe synchronization maximum shutter speed to a time obtained by adding a strobe light emission period at the full light emission to the traveling time of the front curtain, and in a case where the speedup setting is enabled, setting the strobe synchronization maximum shutter speed to a time obtained by adding ⅓EV step to the time obtained by adding the strobe light emission period at the full light emission to the traveling time of the front curtain, and setting the upper limit of the light emission amount of the strobe device to a maximum light emission amount that falls in a time obtained by subtracting the traveling time of the front curtain from the set strobe synchronization maximum shutter speed.

13. A non-transitory computer-readable storage medium storing a program for causing a computer to execute a control method for an image pickup apparatus, the control method comprising:

a step of obtaining setting values that affect a strobe synchronization maximum shutter speed when performing strobe photographing;

a step of calculating a traveling time of a front curtain that controls exposure to an image pickup device based on the setting values; and a light emission amount upper limit value setting step of setting an upper limit value of a strobe light emission amount based on the traveling time of the front curtain.

14. The non-transitory computer-readable storage medium according to claim 13, wherein the light emission amount upper limit value setting step comprises a step of determining whether a speedup setting for speeding up the strobe synchronization maximum shutter speed is enabled or disabled; and a step of, in a case where the speedup setting is disabled, setting an upper limit of a light emission amount of a strobe device to full light emission and setting the strobe synchronization maximum shutter speed to a time obtained by adding a strobe light emission period at the full light emission to the traveling time of the front curtain, and in a case where the speedup setting is enabled, setting the strobe synchronization maximum shutter speed to a time obtained by adding ⅓EV step to the time obtained by adding the strobe light emission period at the full light emission to the traveling time of the front curtain, and setting the upper limit of the light emission amount of the strobe device to a maximum light emission amount that falls in a time obtained by subtracting the traveling time of the front curtain from the set strobe synchronization maximum shutter speed.

* * * * *